(12) United States Patent
Lund et al.

(10) Patent No.: US 9,961,072 B2
(45) Date of Patent: *May 1, 2018

(54) DELEGATING AUTHORIZATIONS

(71) Applicant: Cable Television Laboratories, Inc., Louisville, CO (US)

(72) Inventors: Robert M. Lund, Boulder, CO (US); Steven E. Johnson, Boulder, CO (US)

(73) Assignee: Cable Television Laboratories, Inc., Louisville, CO (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/590,343

(22) Filed: May 9, 2017

(65) Prior Publication Data

US 2017/0244696 A1    Aug. 24, 2017

Related U.S. Application Data

(63) Continuation of application No. 14/604,509, filed on Jan. 23, 2015, now Pat. No. 9,648,003, which is a continuation-in-part of application No. 14/284,667, filed on May 22, 2014, now Pat. No. 9,350,720.

(60) Provisional application No. 61/899,990, filed on Nov. 5, 2013.

(51) Int. Cl.
*H04L 29/06* (2006.01)
*H04L 9/32* (2006.01)
*H04L 29/08* (2006.01)

(52) U.S. Cl.
CPC ........ *H04L 63/0815* (2013.01); *H04L 9/3213* (2013.01); *H04L 63/083* (2013.01); *H04L 63/10* (2013.01); *H04L 67/02* (2013.01)

(58) Field of Classification Search
USPC ............................................................ 726/7
See application file for complete search history.

(56) References Cited

U.S. PATENT DOCUMENTS

| | | | | |
|---|---|---|---|---|
| 2009/0271713 | A1* | 10/2009 | Stull | G06Q 10/10 715/753 |
| 2009/0313321 | A1* | 12/2009 | Parsons | H04L 41/0253 709/203 |
| 2012/0117586 | A1* | 5/2012 | McCoy | H04N 21/4126 725/25 |
| 2014/0007205 | A1* | 1/2014 | Oikonomou | G06F 21/35 726/6 |

* cited by examiner

Primary Examiner — Jason Lee
(74) Attorney, Agent, or Firm — Great Lakes Intellectual Property, PLLC

(57) ABSTRACT

Delegating authorizations sufficient to access services is contemplate. The authorization may be delegated in the form of a token or other transmissible construct relied upon to authenticate access to services, such as but not necessarily limited to conferring a user identity established via authenticated device for the purposes of enabling an unauthenticated or unsecured device to access a service associated with the user identity.

20 Claims, 11 Drawing Sheets

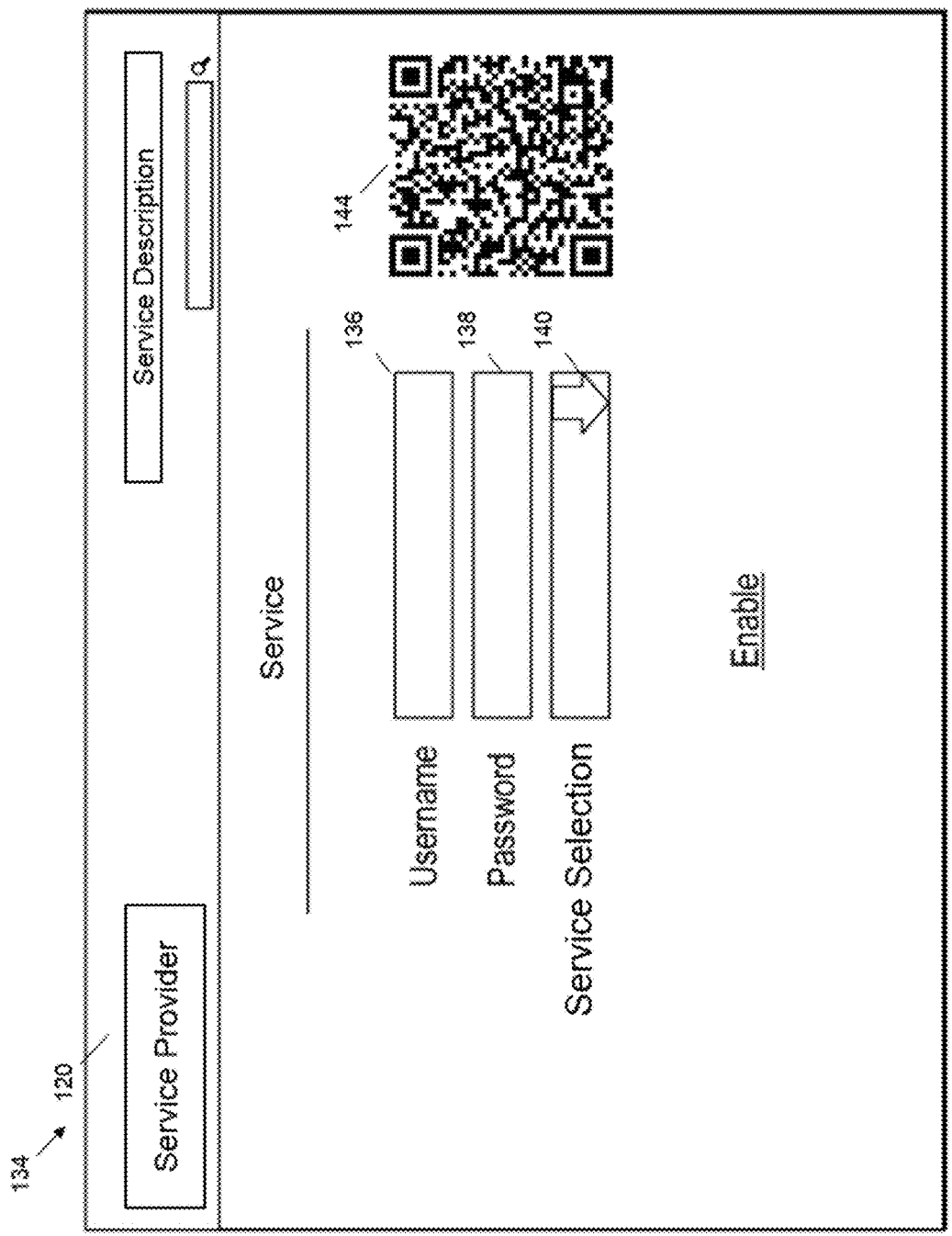

DELEGATING AUTHORIZATIONS

CROSS-REFERENCE TO RELATED APPLICATIONS

This application is a continuation of U.S. application Ser. No. 14/604,509 filed Jan. 23, 2015, which in turn is a continuation-in-part of U.S. application Ser. No. 14/284,667 filed May 22, 2014, which in turns claims the benefit of U.S. provisional application No. 61/899,990 filed Nov. 5, 2013, the disclosures and benefits of which are hereby incorporated in their entireties by reference herein.

TECHNICAL FIELD

The present invention relates to delegating authorizations in the form of a token or other transmissible construct, such as but not necessarily limited to conferring a user identity established via an authenticated device for use with an unauthenticated or unsecured device.

BACKGROUND

A user may authenticate a user identity with a device by inputting user information through the device for verification with an identify provider (IdP), a trusted authority, trusted certificate authority, etc., such as with a username and password combination, personal identification number (PIN) or other identifying information. The ability to establish the user identity with a particular device may be beneficial in enabling that device to access user content previously stored or otherwise kept at a service provider, such as but not necessary limited to user content kept with file service providers, social media providers, Internet service providers, messaging providers (text, email, etc.) or other service providers tasked with managing user content for a plurality of users on an individual basis. Some such service providers may provide a webpage, portal, application or other interface through which user content or entitlements to service provider sourced content may be accessed and/or manipulated in desirable ways upon receipt of the user information necessary to authenticate a device with a particular user identity.

A vast number of such service providers are available and utilize user identity and other trust related mechanisms for managing access to content/services. User content may be stored across multiple service providers, such as to facilitate maintaining work files at one service provider while maintaining social media or personal pictures at a different service provider, and/or users may be entitle to services sourced from any number of service providers according to associated subscriptions or service level agreements. Any number of scenarios may exist where users find themselves keeping or maintaining their personal user content at various service providers or attempting to otherwise access services therefrom. The service providers may operate disparate procedures, protocols and other processes for controlling, maintain or otherwise authenticating access to the user content within their control, which can be problematic and inconvenient for the users. One non-limiting aspect of the present invention accordingly contemplates ameliorating the burden and inconvenience attendant to users accessing desired content and services.

BRIEF DESCRIPTION OF THE DRAWINGS

FIG. 14 illustrates a login page in accordance with one non-limiting aspect of the present invention.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
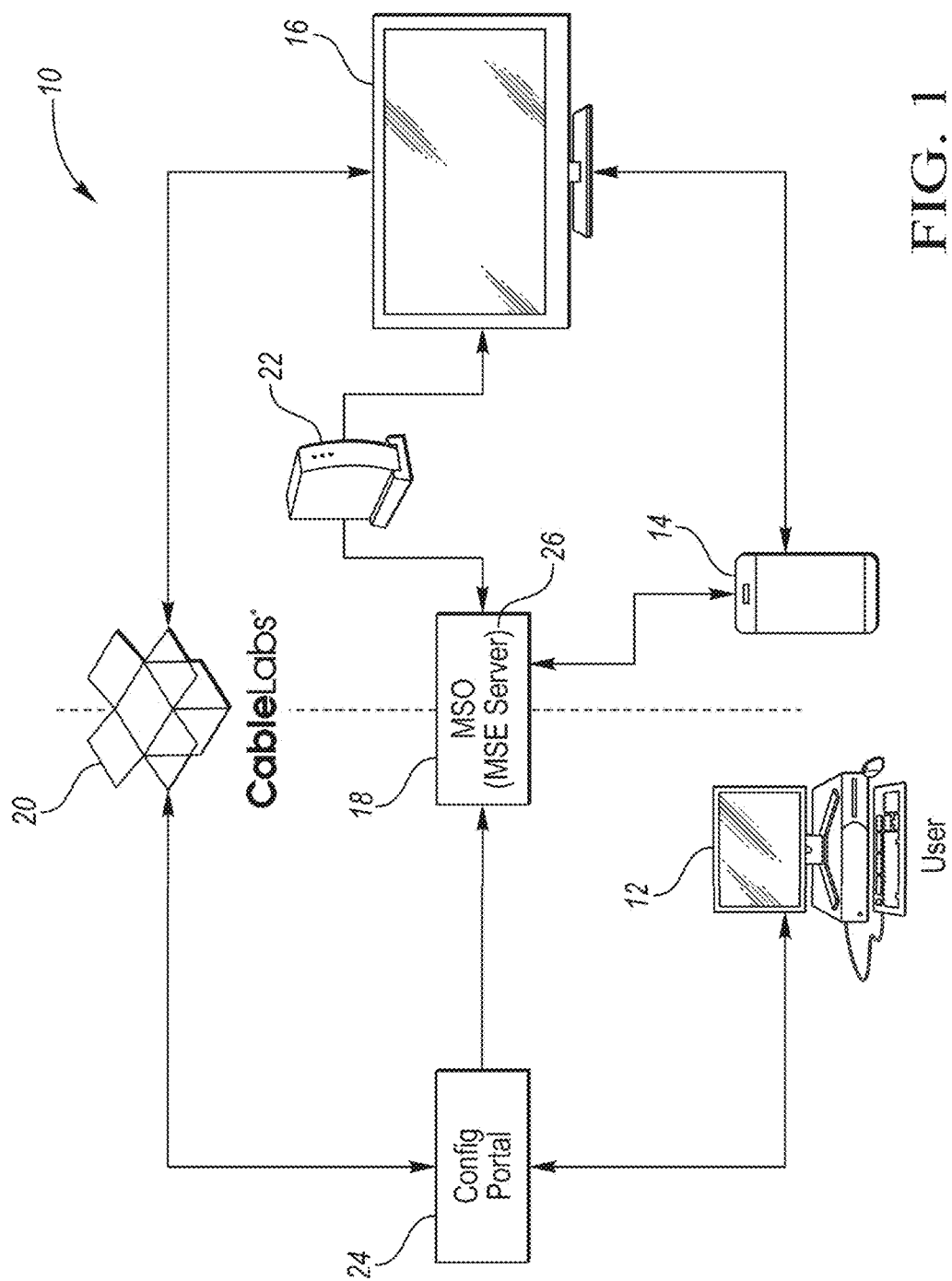
FIG. 1 illustrates a system for delegating authorizations in accordance with one non-limiting aspect of the present invention.

FIG. 1 illustrates a system 10 for delegating authorizations in accordance with one non-limiting aspect of the present invention. The system 10 illustrates an exemplary scenario where a user 12 may desire to delegate authorizations associated with an authenticated device (referred to hereinafter as a control device) 14 or a user thereof to a non-authenticated or unsecured device (refer to hereinafter as a sink device) 16. The ability to delegate authorizations in the contemplated manner may be beneficial in conferring a user identity to the sink device 16 so as to permit the sink device 16 access to content, information, entitlements and other electronically transmittable media, hereinafter interchangeable referred to generically as services, associated with the user 12 of the control device 14. The contemplated conferring of user identity may be facilitated in a manner that eases the burden and inconvenience associated with enabling access to user services associated with service providers 18, 20, particularly when a single user keeps or maintains services at multiple service providers 18, 20 and desires to enable the control and/or sink devices 14, 16 to access the dispersed user services. The contemplated processes may also remove the need for the user to repeatedly convey their identity for multiple service providers, which may reduce unauthorized identity sharing or identity theft.

The system 10 illustrates a first service provider 18 and a second service provider 20 for exemplary non-limiting purposes as the user may desire access to user services stored at any number of service providers 18, 20.

The user services may correspond with any type of electronically transmissible services or media associated with the user, such as but not necessary limited to computer files, videos, pictures, messages, recordings, etc. The first and second service providers 18, 20 may have a relationship with the user to provide services for content provided from the user and/or to provide content from other sources to the user. The first service provider 18 may correspond with a multiple system operator (MSO) configured to provide television services, Internet services, high-speed data services, etc. by way of an access point 22 under its control, such as in the manner described in U.S. patent application Ser. Nos. 14/181,640, 14/181,641, 14/181,643 and 14/181,645, entitled Multiple-Input Multiple-Output (MIMO) communications, the disclosures of which are hereby incorporated by reference in their entireties herein. The access point 22 is shown for exemplary non-limiting purposes to correspond with a gateway or a router, such as but not necessary limited to a cable modem or a set-top box (STB). The second service provider 20, while it may be part of the first service provider 18, is shown for exemplary non-limiting purposes to operate independently of the first service provider 18 as an over-the-top service dependent on the access point 22 controlled with the first service provider 18.

FIG. 1 illustrates a configuration portal 24 configured in accordance with the present invention to facilitate registering a user identity for the user with the second service provider 20. The configuration portal 24 may be a webpage or other interface sufficient to facilitate the operations contemplated herein. The configuration portal 24 may include capabilities to enable communications between the user (computer) 12 and the first and second service providers 18, 20 to enable exchange of access tokens, credentials or other trust related mechanisms. One non-limiting aspect of the present invention contemplates the configuration portal 24 being utilized to facilitate the second service provider 20 authenticating the user and issuing a corresponding access token for safekeeping at a My Stuff Everywhere (MSE) server 26 of the first service provider 18. The user 12, the configuration portal 24 and/or the first and second service providers 18, 20 may obtain, issue, preserve and execute access tokens or perform other related operations in the manner described in U.S. patent application Ser. No. 13/423, 359, entitled Multiple Access Point Zero Sign-On, the disclosure of which is hereby Incorporated by reference in its entirety. The number of times a user is required to enter a username and password combination or provide other authenticating information via user input of alphanumeric characters may be ameliorated using ZSO techniques.

One non-limiting aspect of the present invention relates to delegating authorizations when access to services from another service provider is desired, such as in the above-described process where the user may desire conferring authorizations in order to enable the sink device 16 access to user services stored at the second provider 20. The user desiring to allow the sink device 16 to access the user's services at the second service provider 20 may be non-authenticated or otherwise unknown to the first service provider 18 and/or the second service provider 20 whereas the control device 14 may be authenticated with the first service provider 18. The control device 14 may be a device trusted by the first service provider 18 and/or that has completed a sign-on operation or otherwise provided credentials to the first service provider 18. The control device 14 may rely on its established trust with the first service provider 18 to confer access tokens associated with the user's services at the second service provider 20 to the non-authenticated sink device 16, thereby creating a temporary authentication for the sink device 16 to access the user's services at the second service provider 20. The control device 14 may be a mobile phone, a computer or other device issued or maintained by the first service provider such that it may have already registered with the first service provider 18 to access related services. The sink device 16 may not have registered itself with the first service provider 18 or the second service provider 20, e.g., the sink device 16 may be a web-enabled television or other device operable to playback television programming streamed over the Internet as opposed to the control device 14 that may be similarly configured to playback television programming stream from the first service provider 18.

The contemplated delegation of authorizations may be utilized to enable user access to services essentially everywhere or on virtually any device even if the device has not been authenticated or otherwise identified to one of the first and second service providers 18, 20 or other non-illustrated service providers operable according to the processes described herein. The delegated authorizations are predominately described as being authorizations conferred with an access token for exemplary non-limiting purposes as the present invention fully contemplates delegating other types of authorizations besides just those attendant to use of access tokens. The contemplated access tokens may be mechanisms by which entitlements, rights or other user specific information may be tangibly transferred from one place to another. The transfer of access tokens is also predominately described with respect to the second service provider 20 or additional non-illustrated service providers operating independently of the first service provider 18 transmitting the access tokens to the first service provider 18 for subsequent delegation. The service provider 20 originating the access tokens may relate each access token to one or more users and their corresponding user services such that each access token may provide access to a certain portion of the user services associated with the related service provider 20.

The present invention contemplates the use of various protocols and formats to facilitate message and other operations attendant to facilitating the contemplated processes, including but not limited to [AUTH1.0] Authentication and Authorization Interface 1.0 Specification, CL-SP-AUTH1.0-I03-120118, Jan. 18, 2012, Cable Television Laboratories, Inc.; [ID-BearerTokens] IETF Internet Draft, The OAuth 2.0 Authorization Protocol: Bearer Tokens, M. Jones, D. Hardt, and D. Recordon, draft-ietf-oauth-v2-bearer-15.txt, December 2011; [ID-JWT] IETF Internet Draft, JSON Web Token (JWT), M. Jones, D. Balfanz, J. Bradley, Y. Goland, J. Panzer, N. Sakimura, P. Tarjan, draft-jones-json-web-token-07.txt, December 2011; [ID-OAuth Assertions] IETF Internet Draft, OAuth 2.0 Assertion Profile, M. Jones, B. Campbell, Y. Goland, draftietf-oauth-assertions-01, October 2011; [ID-OAuth] IETF Internet Draft, The OAuth 2.0 Authorization Protocol, E. H-Lahav, D. Recordon, D. Hardt, draft-ietf-oauth-v2-22.txt, September 2011; [SAML Bindings] OASIS Standard, Bindings for the OASIS Security Assertion Markup Language (SAML) v2.0, March 2005; [SAML Core] OASIS Standard, Assertions and Protocols for the OASIS Security Assertion Markup Language (SAML) v2.0, March 2005; OAuth; Security Assertion Markup Language (SAML), JavaScript Object Notation (JSON); Bearer Tokens; Online Content Access (OLCA); the disclosures of which are hereby incorporated by reference in their entireties herein.

Figure 2:
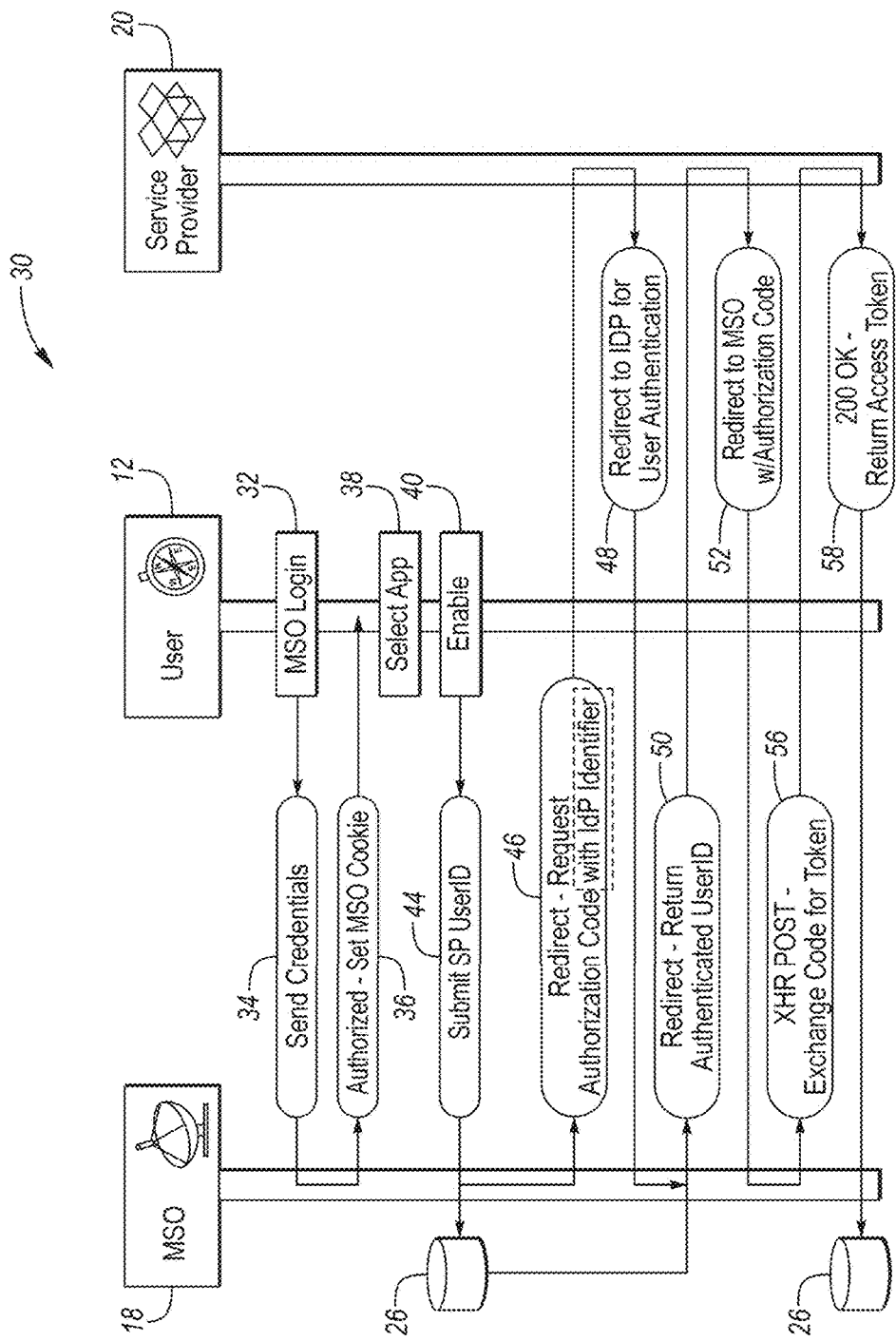
FIG. 2 illustrates a flowchart for a SAML based process for issuing access tokens in accordance with one non-limiting aspect of the present invention.

FIG. 2 illustrates a flowchart 30 for a SAML based process for issuing access tokens from the second service provider 20 to the first service provider 18. The method is described with respect to issuing access tokens from a single service provider to a single service provider for exemplary non-limiting purposes as the present invention fully contemplates facilitating similar operations for any number of service providers and/or any number of users. The flowchart generally relates to a method for authenticating a user identity for a user to the service providers 18, 20 so as to enable the user to subsequently access their user services according to permissions or other entitlement specified within a corresponding access token. The process may be executed once between the user and the first and second service providers 18, 20 such that updates or changes to the user services associated with each access token may be automatically adjusted without requiring the user to have to redo or otherwise repeatedly perform similar operations. The access tokens may be issued from the second service 20 provider and kept at the first service provider 18 in accordance with a maintenance policy and without tying the access tokens to a device used by the user at the time of undertaking the noted operations.

Figure 3:
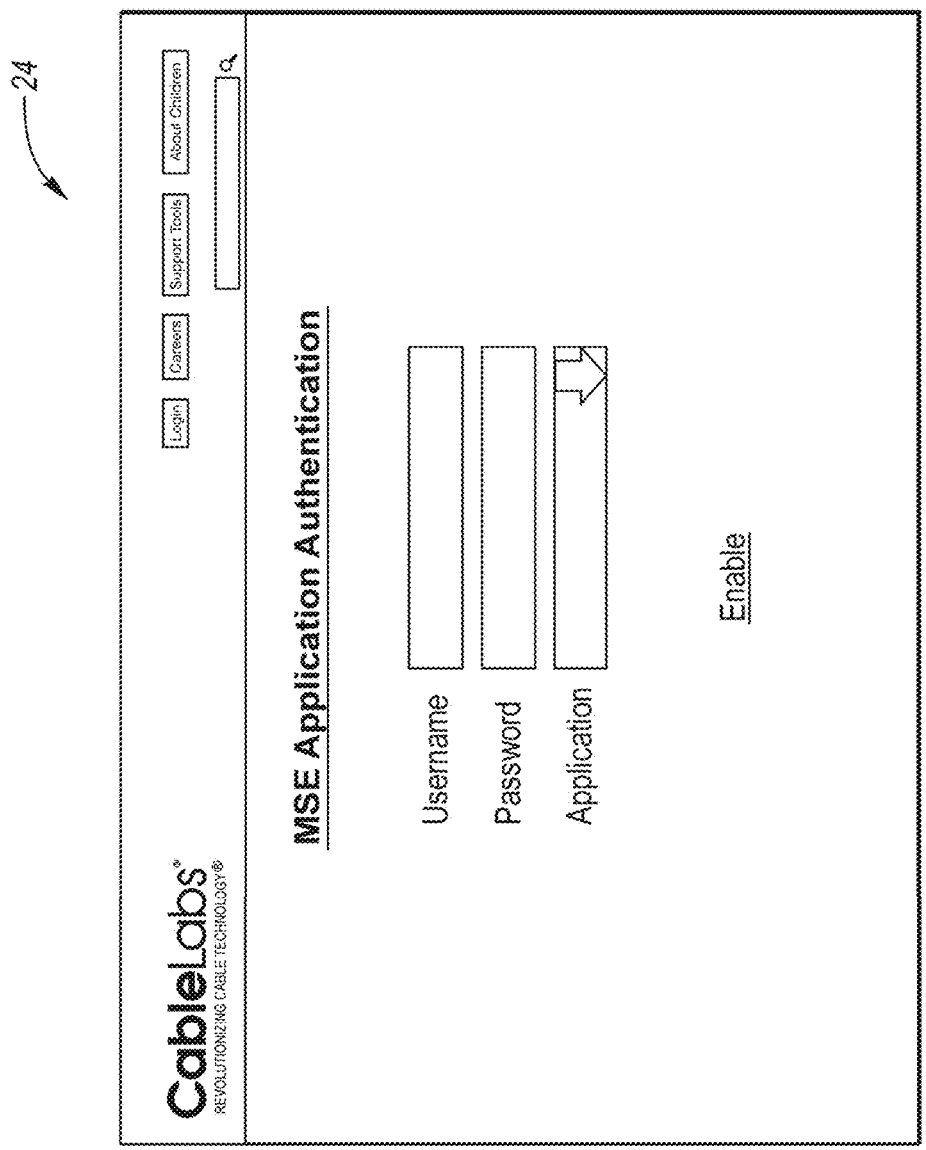
FIG. 3 illustrates a configuration portal in accordance with one non-limiting aspect of the present invention.

Block 32 relates to the user performing a login operation to the configuration portal 24. FIG. 3 illustrates the configuration portal 24 associated with the login operation in accordance with one non-limiting aspect of the present invention. The portal 24 may be displayed as a webpage downloaded to the user's device at the time of registration. The portal is shown in include a username field, a password field, an application field and an enable button. The username and password fields may be utilized to enter a user name and password combination unique to the user. The application field may provide a drop-down list or other mechanism to facilitate identifying the application of the second service provider 20 or other service provider from which delegation of the corresponding stored user services is desired. The enable button may be a hyperlink or other command button to indicate user completion of the noted fields. The portal is illustrated as one example of many different types of user interfaces operable to facilitate receiving user inputs in accordance with the present invention. Returning to FIG. 2, Block 34 relates to sending credentials to the first service provider 18. The credentials may correspond with the username and password or other authenticating user identification.

Block 36 relates to the first service provider issuing a cookie to the user. The cookie may identify applications available for delegation and/or confer a temporary authentication to the user to facilitate selecting the applications, such as using the drop-downfield shown in FIG. 3. Following selection of the desired application in Block 38 and selection of the enable button in Block 40, Block 44 relates to submitting a service provider (SP) userID of the service provider associated with the selected application, i.e., the second service provider 20, to the first service provider 18. Block 46 relates to the first service provider performing a redirect to request an authorization code from the second service provider 20. Block 48 relates to the second service 20 provider obtaining a user authentication using a redirect to the specified identity provider (IdP), in accordance with SAML operations. Block 50 relates to the first service provider 18, also acting as the IdP, returning an authenticated user ID using a redirect to the second service provider 20. Block 52 relates to the second service provider 20 responsively generating an authorization code for the first service provider 18 using a redirect. Block 56 relates to the first service provider 18 issuing an XHR post with an exchange code to request an access token from the second service provider 20 for the identified user. Block 58 relates to the second service provider 20 generating a corresponding access token and providing it to the first service provider for maintenance.

Figure 4:
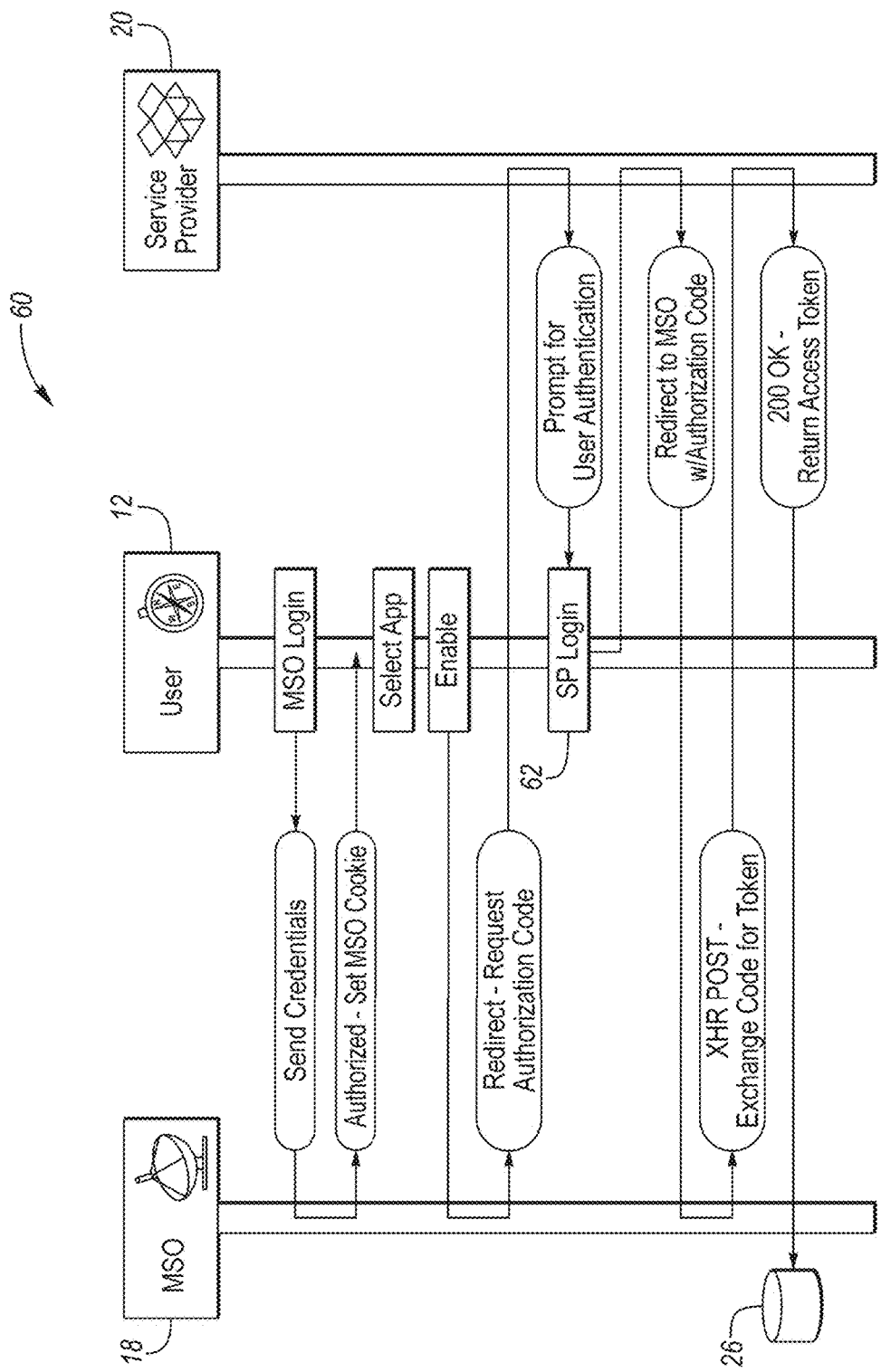
FIG. 4 illustrates a flowchart for an OAUTH based process for issuing access tokens in accordance with one non-limiting aspect of the present invention.

FIG. 4 illustrates a flowchart 60 for an OAUTH based process for issuing access tokens from the second service provider 20 to the first service provider 18 in accordance with one non-limiting aspect of the present invention. The OAUTH based process may be similar to the above-described SAML process where various redirects and other HTML commands are utilized to facilitate authenticating the user identity with the second service provider 20 via messaging exchanged through the first service provider 18 for the purposes of generating an access token at the second service provider 20 for storage at the first service provider 18. The OAUTH based processes may include an additional process 62 where the user may login or otherwise identify themselves to the second service provider 20 in order to facilitate generation and issuance of the access token. The OAUTH and SAML based processes are shown for exemplary non-limiting purposes to demonstrate the use of the present invention with protocols operable over the Internet to facilitate issuing access tokens and other credentials using established messaging constructs. One non-limiting aspect of the present invention contemplates enabling the user to facilitate delivery of the access tokens from the second service provider 20 to the first service provider 18 using the configuration portal 24 or other webpage or interface maintained by the first service provider 18 so as to facilitate maintenance of multiple access tokens at the first service provider 18, e.g., the process can be repeated for multiple users and multiple service providers 20 so as to enable the first service provider 18 to generate a repository of access tokens for its subscribers.

Figure 5:
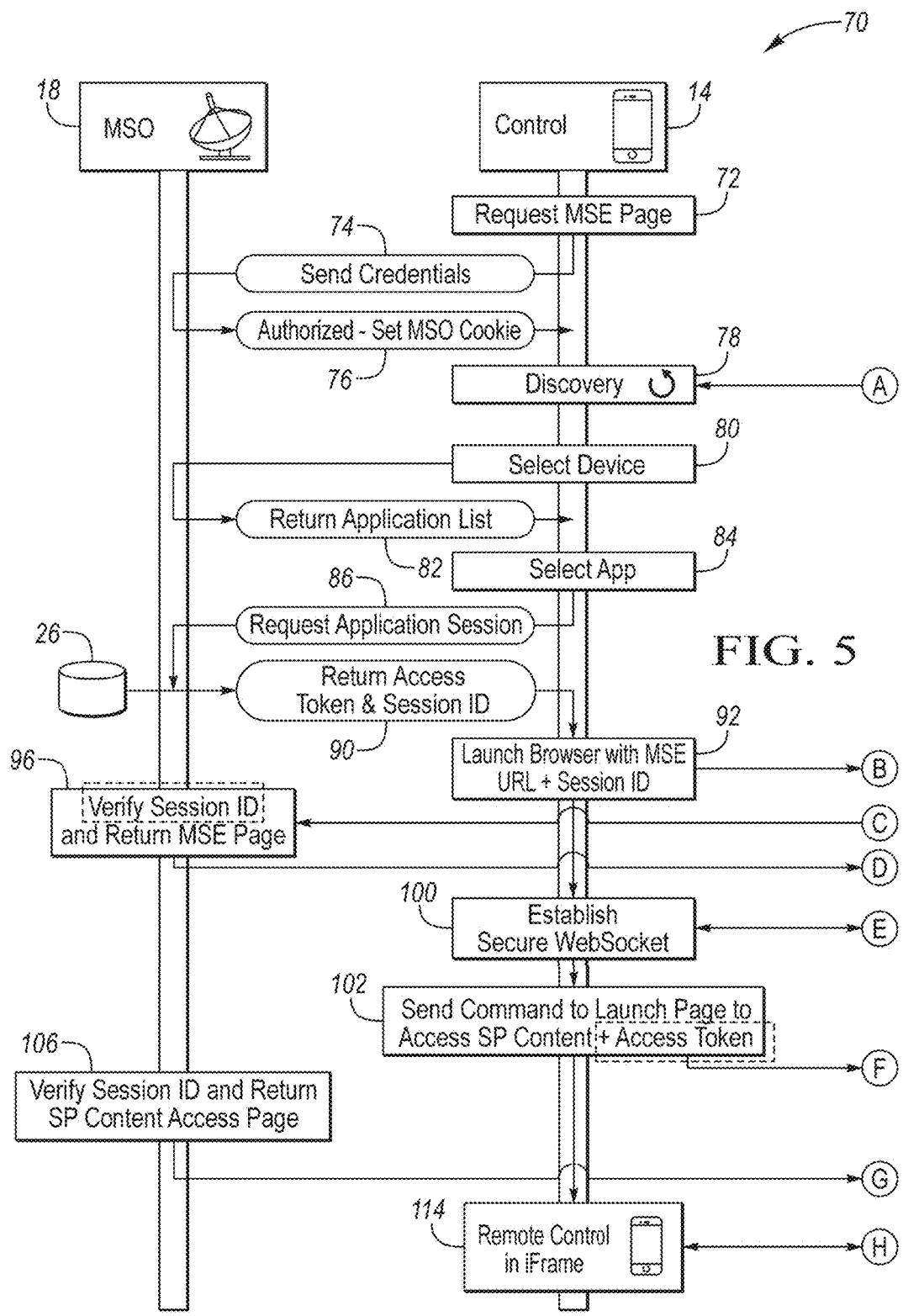
FIG. 5 illustrates a flowchart for delegating authorizations in accordance with one non-limiting aspect of the present invention.
Figure 5:
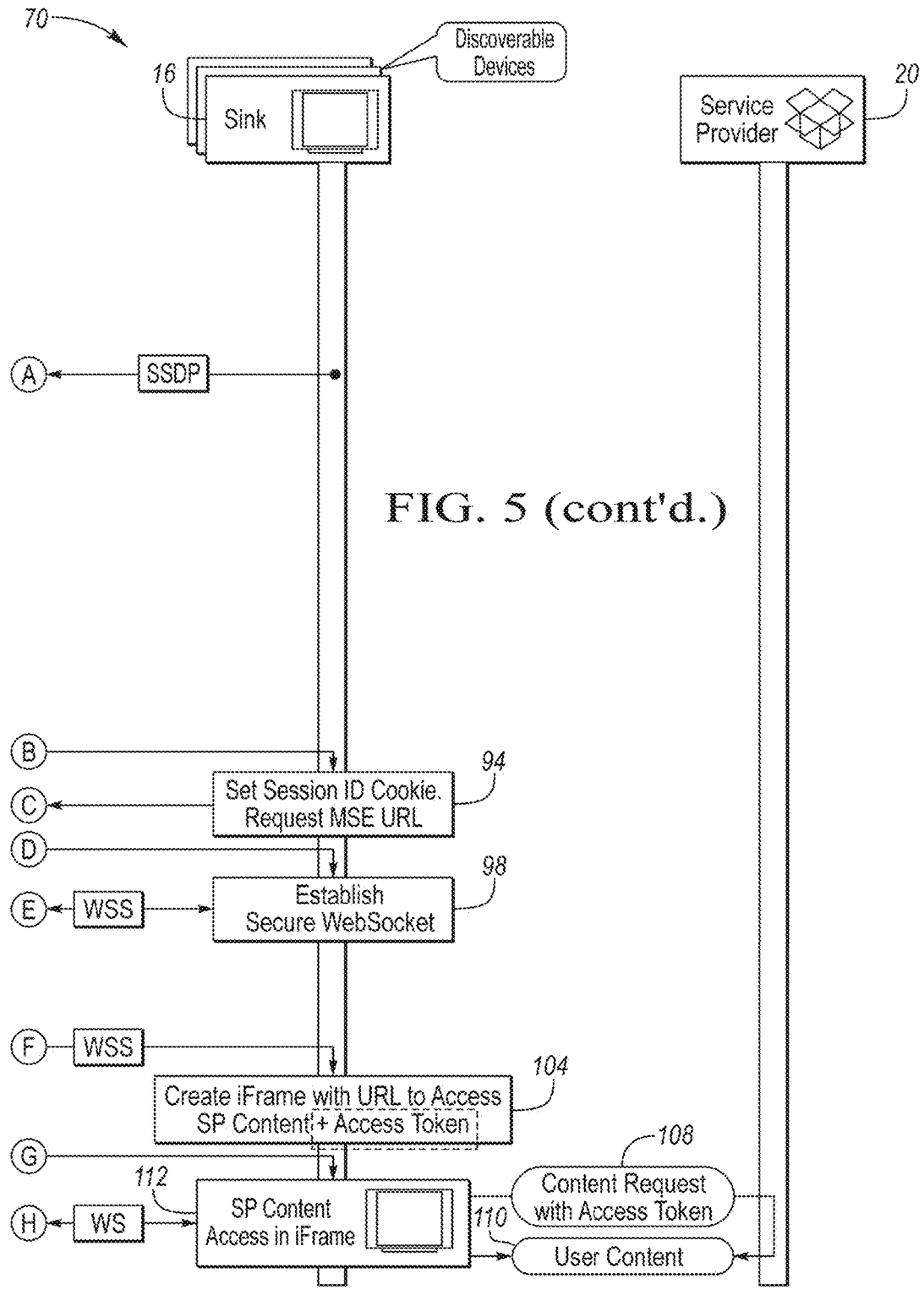

FIG. 5 illustrates a flowchart 70 for delegating authorizations in accordance with one non-limiting aspect of the present invention. The flowchart 70 is described with respect to delegating authorizations for a single user and a single service provider to demonstrate the operations and processes of the present invention, however, the same or similar processes may be repeated or simultaneously performed to facilitate delegations for multiple users and/or multiple service providers. The method is described with respect to delegating authorizations to enable the user to enable the sink device 16 to access user services kept at the second service provider 20, such as to enable the sink device 16 to access movies (user services) kept by the second service provider 20 without authenticating the sink device 16 to the first service provider 18. The method contemplates beginning the delegation of authorizations from a trusted device (e.g., control device 14) or a device authenticated with the first service provider 18 or other entity tasked with maintaining multiple access tokens. Once the control device 14 is authenticated, the delegation of authorizations may be performed in a zero sign-on manner (ZSO) so that the user need not input credentials or other user identity information for the purposes of accessing the user services via the sink device 16.

Figure 6:
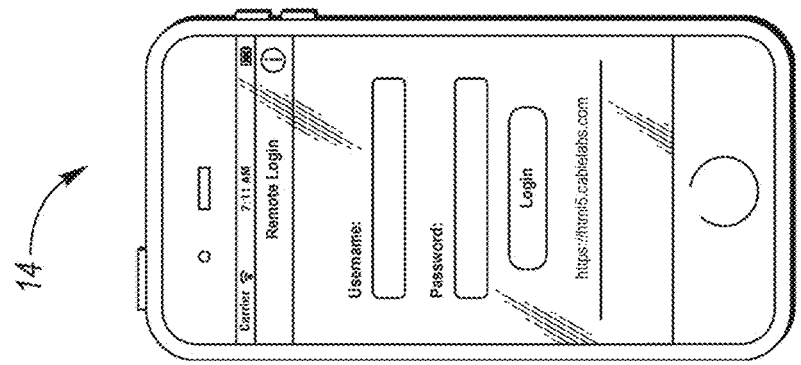

Block 72 relates to the control device 14 requesting access to a MSE webpage. The MSE webpage may be displayed on the control device 14 and act as an initiation point through which the authorization delegation process may begin, which for exemplary purposes is described as being hosted by the first service provider 18. FIG. 6 illustrates a login screen of the MSE webpage displayed on the control device 14 to receive a username and password combination. Block 74 relates to the control device 14 transmitting the username and password combination or other user identifying credential to the first service provider 18 (ZSO may be utilized instead of a username and password combination). Block 76 relates to the first service provider 18 responding with a cookie indicating authorization of the control device 14. The cookie may be issued from the first service provider 18 after verifying the credentials are from a user and/or a control device 14 within the domain or control of the first service provider 18. The domain of the first service provider 18 may be based on media access control (MAC) addresses or other information previously associated with the control device 14, such as in the manner described in the patent applications incorporated by reference herein. Block 78 relates to the control device 14 performing a discovery operation to detect nearby devices that may be suitable to operate as the sink device 16 or other device to be delegated an authorization.

The discovery process is shown for exemplary non-limiting purposes to be performed according to the Simple Service Discovery Protocol (SSDP), the disclosure of which is hereby incorporated by reference in its entirety. The discovery process may determine when one or more devices in proximity of the control device 14 having capabilities sufficient to facilitate operations contemplated herein. The proximity assessment may be based on a wireless signaling range to the control device 14 or other characteristics sufficient to establish a proximity relationship of the sink device 16 to the control device 14. The proximity between the sink device 16 and the control device 14 may be beneficial in order to establish at least some level of trust that the device 16 being delegated authorizations is within the control or range of control of the user associated with the control device 14. Of course, if the proximity relationship is undesirable, such as if the user desires to delegate authorizations to subscribers within their home while at another location, the discovery process may rely upon other proximity related parameters to identify available sink devices 16, e.g., sink devices connected to a trusted access point of the first service provider may be similarly discovered.

The discovery of the sink device 16 may be particularly relevant to non-authenticated devices or devices that have not otherwise establish a trusting relationship with the first service provider 18 or a second service provider 20. As users may store or generate services across multiple service providers, the users may similarly desire access to that services on devices that have not been recognized or otherwise approved for operations associated with the first service provider 18 or the non-authenticated sink device 16. The ability to confer delegations to such non-authenticated devices may be beneficial in enabling users to not only access user services on authenticated devices like to the control device 14 but also to essentially access their services everywhere, i.e., non-authenticated devices. The capability to enable non-authenticated devices 16 to access user services may be beneficial when the first service provider 18 lacks the ability to authenticate the non-authenticated devices 16 on behalf of a second service provider 20 or to otherwise communicate therewith, e.g., first service provider 18 may not have developed code or protocol sufficient to enable it to communicate the user's credentials for a second service provider 20 with the non-authenticated devices 16.

Figure 7:
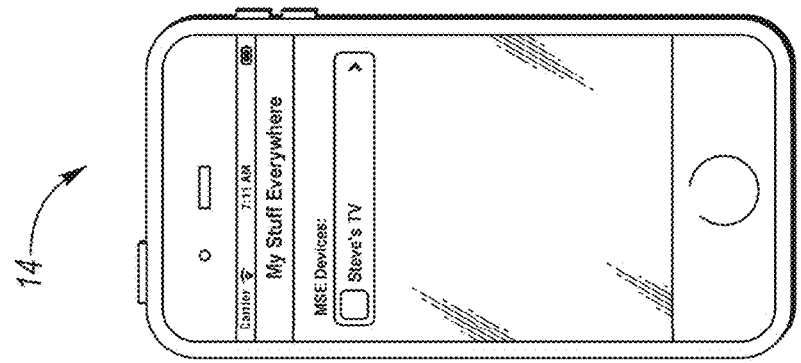

The discovery process may be performed in the background of the MSE webpage such that the MSE webpage may be automatically updated or re-loaded once one or more devices are discovered. FIG. 7 illustrates a corresponding update of the MSE webpage on the control device 14 to indicate a nearby sink device 16, which is labeled as "Steve's TV". In the event additional sink devices 16 are detected, those sink devices 16 may be similarly indicated with icons or other alphanumeric representations sufficient to distinguish them from one another. Block 80 relates to the control device detecting user selection of one of the sink devices 16 displayed as being available and communication of a corresponding message to the first service provider 18. Block 82 relates to the first service provider 18 identifying the sink device 16 and transmitting a corresponding application list to the control device 14. The application list may identify a plurality of service providers having applications operable with the identified sink device 16 and/or the applications for which the user has previously requested access tokens, i.e., the applications having access token stored at the first service provider 18. The first service provider 18 may utilize the user identity established with the credentials to determine the applications included in the application list (some service providers may support multiple applications).

Figure 8:
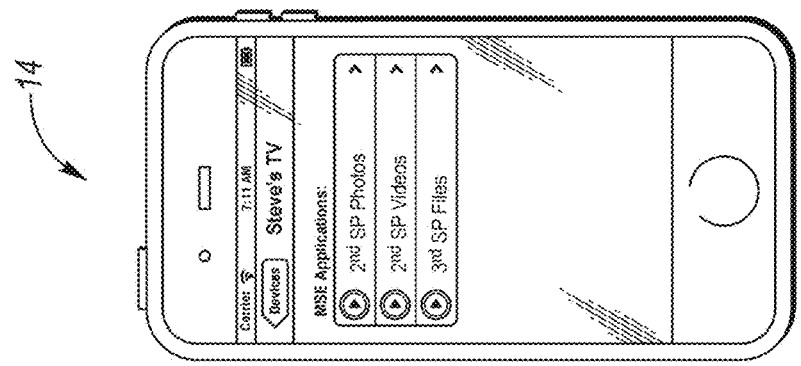
FIGS. 6-8 illustrate a MSE webpage on a control device in accordance with one non-limiting aspect of the present invention.

FIG. 8 illustrates the MSE webpage being updated to indicate the applications available for delegating authorizations. The updated MSE webpage indicates a first, second and third application being available for delegation of access tokens previously provided to the first service provider 18. Additional applications may be displayed through selection of an addition button (not shown) if the user fails to identify an application of interest. The addition button may be used to call up or otherwise access the configuration portal described above to facilitate enabling the first service provider to obtain access tokens for desired applications, i.e., the above processes can be repeated in order to obtain an access token for a non-listed application. The first and second applications are respectively associated with photos and videos kept at the second service provider ($2^{nd}$ SP) and the third application is associated with electronic files kept at a third service provider (3rd SP). Block 84 relates to the user selecting one of the applications shown within that MSE webpage, which is assumed for exemplary purposes to correspond with one of the applications associated with the second service provider 20. Similar processes may be performed in the event an application (e.g., third application) from a service provider other than the second service provider 20 was determined.

Block 86 relates to the control device 14 issuing a request application session message to the first service provider 18 indicating the application selected for delegation. Block 90 relates to the first service provider 18 identifying the access token associated with the application and the user identified to be making the request. The access token transmitted to the control device 14 or the service provider 20 may be selected from a plurality of access tokens kept at the first service provider 18 for its various users and their associated applications, e.g., a single user may have multiple user access tokens for different applications, different service providers or different portions of the user services kept at the service providers. Block 90 may also include the first service provider 18 generating a session ID cookie. The session ID cookie may be a dynamically generated set of data determined proximate in time to receipt of each request for an application session. The session ID cookie may provide a set of information proximate in time to identifying a need to perform a delegation, such as to provide a relationship between the identified user (credentials), the identified sink device 16 and the identified application determined in the preceding Blocks. The session ID cookie may include timestamps, addressing information and other types of data that may be useful to tracking activities occurring as a result of the delegation, including facilitating advertisement and billing customers for usage.

Figure 9:
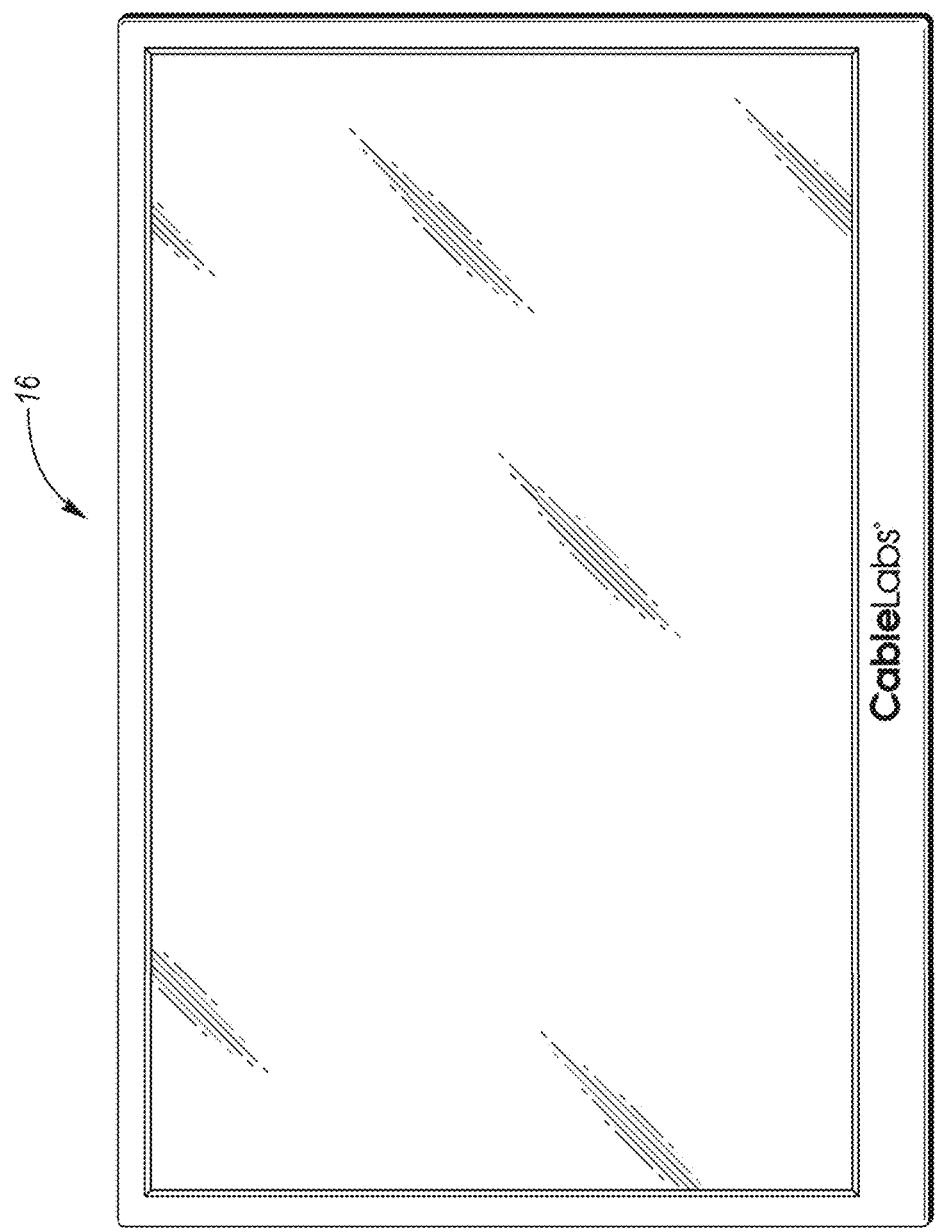
FIG. 9 illustrates a sink device in accordance with one non-limiting aspect of the present invention.
Figure 10:
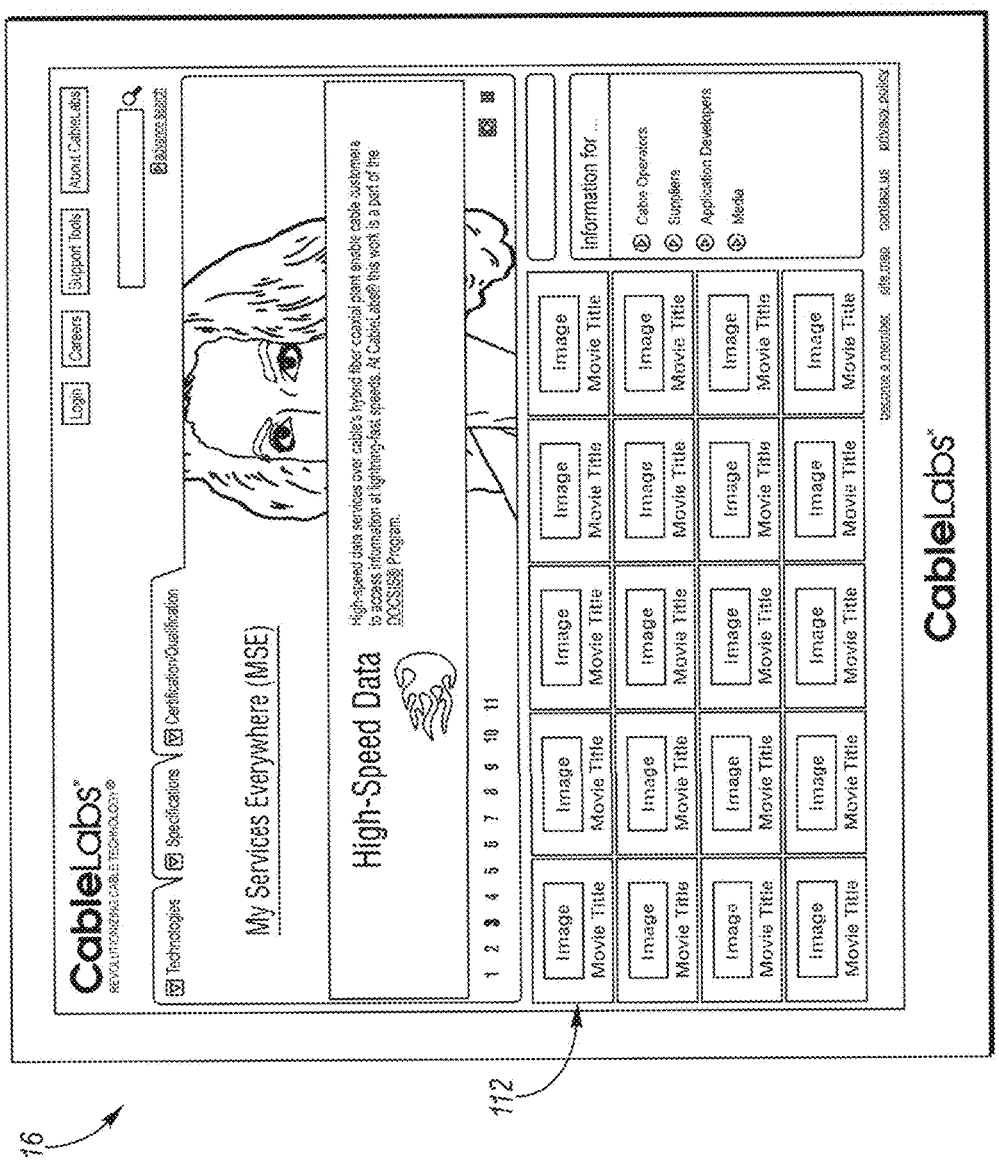
FIG. 10 illustrates a MSE webpage on a sink device in accordance with one non-limiting aspect of the present invention.

Block 92 relates to the control device 14 transmitting a launch browser command to the sink device 16 along with a MSE URL and the session ID cookie, such as through an unsecured connection establish as part of the previous discovery process. The launch browser command may prompt the sink device 16 in Block 94 to engage a web browser to access the MSE URL for the purposes of transmitting the session ID cookie to the first service provider 18. FIG. 9 illustrates the sink device 16 being a television and launching the web browser as a function of receiving the launch browser command in accordance with one non-limiting aspect of the present invention. The television may display a blank screen as shown or additional information related to the first service provider 18 or other entity designed to provide advertisements or other information upon launching of the web browser. Optionally, the launching of the web browser may occur in the background without a user watching the television identifying the browser launch, such as to enable the delegation of authorizations prior to interrupting viewing on the television. Block 96 relates to the first service provider 18 verifying the session ID received from the sink device 16 and returning a MSE webpage. FIG. 10 illustrates the MSE webpage shown on the sink device 16 in accordance with one non-limiting aspect of the present invention.

The first service provider 18 may verify the session ID prior to returning the MSE webpage in order to assure that it was properly issued. The first service provider 18 may keep a record of session IDs and/or additional information, such as MAC or IP addresses, to determine whether the session ID is still valid, e.g., that it has not expired, and/or whether it was received from a valid sink device. One non-limiting aspect of the present invention contemplates delegating authorizations to non-authenticated devices or unsecured devices, optionally characterized by the devices lacking a relationship or prior trusting relationship with the first service provider 18. In the event the delegation is intended for such devices, the session ID verification may simply correspond with assessing whether the session ID is still valid so that it can be performed without assessing a character or nature of the sink device 16 associated therewith. Instructions may be included within the MSE webpage to prompt the sink device 16 to establish a secure connection with the control device 14 in Block 98. The secure connection may be established using a secure WebSocket, a Transport Layer Security (TLS) tunnel or other secured connection having security enhanced over that in place when exchanging the session ID with the sink device 16. Blocks 100, 102 relate to the control device 14 establishing the secure connection and sending the sink device 16 a command to launch a services access page and the access token.

Block 104 relates to the sink device 16 issuing a request for the services access page according to a URL included within the command of Block 102 as well as re-transmitting the session ID to the first service provider 18. The re-transmission of the session ID may be used to check for continued validity of the corresponding session, such as to confirm validity by any policies of the first service provider 18 or to enforce that the session is initiated within a certain amount of time. Block 106 may relate to the session ID being verified and the first service provider 18 returning the corresponding services access page to the sink device 16. The services access page may include instructions or the instructions may be associated therewith, such as in the form of a redirect, to prompt the sink device 16 to issue a content request in Block 108 to the second service provider 20 or other service provider associated with the application requiring delegation of authorizations. The content request may include the access token provided from the first service provider 18, and optionally additional information necessary to verify access to the corresponding portion of the user services. Block 110 relates to the second service provider 18 verifying the received access token, and if verified, return a corresponding portion of the user services. The received user services may be displayed within an iFrame 112 of the services access page. FIG. 10 illustrates the iFrame 112 corresponding with a portion of the MSE page.

The iFrame 112 may be essentially a page within the MSE page used to display identifying information sufficient for the user to retrieve or otherwise access their user services. The exemplary illustration assumes the user services to correspond with a plurality of movies such that the available movies may be listed in a grid with an image and movie title to facilitate selection. The user may interact with the MSE webpage to facilitate downloading or otherwise accessing the user services from the second service provider 20, such as by streaming or downloading the corresponding movie to the sink device for playback. The playback may begin in a different web browser or with full-screen viewing on the sink device 16, thereby enabling access to user services using authorizations delegated from the user identified with the control device 14. Instead of requiring the user to log the sink device 16 into the second service provider 20, the present invention enables a user experience to be performed without requiring such a login and optionally while maintaining a user interface associated with the first service provider, i.e., the MSE webpage may provide branding other information associated with the first service provider 18 while enabling user access to services kept at other service providers 20. Of course, the present invention is not necessary limited to providing access to the user services via an iFrame and may utilize any number of other user interfaces support playback mechanisms to facilitate access.

Figure 11:
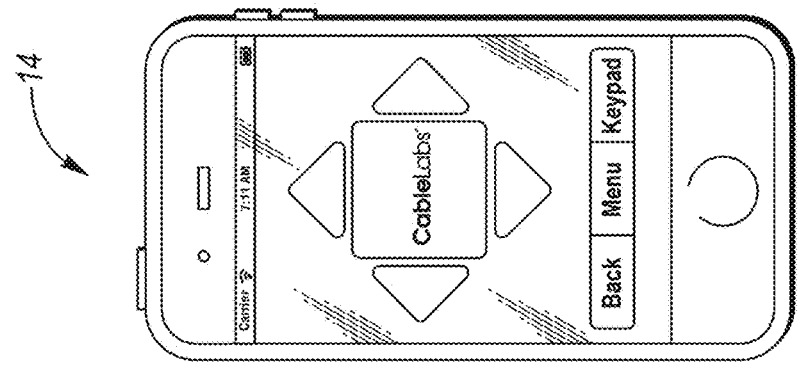
FIG. 11 illustrates a remote control webpage in accordance with one non-limiting aspect of the present invention.

Blocks 112, 114 relate to the control device 14 operating as a remote control for the user services and/or the iFrame. The remote control may be achieved by providing a shared Document Object Model (DOM) between the control device 14 and the sink device 16, such as in the manner described in U.S. patent application Ser. No. 13/922,386, entitled Administration of Web Page, the disclosure of which is hereby Incorporated by reference in its entirety. FIG. 11 illustrates a remote control webpage being displayed on the control device 14 in accordance with one non-limiting aspect of the present invention. The remote control webpage may display various navigational features or other user selectable options associated with remotely controlling a pointer other feature within the MSE webpage on the sink device 16. The capability to utilize the control device 14 to remotely control the sink device 16 using shared DOM and the associated HTML messaging and other operations described in the above-Incorporated an application may be beneficial in facilitating access to user services essentially everywhere while also providing a means for remotely controlling playback and other related operations essentially through any device having HTML support.

Figure 12:
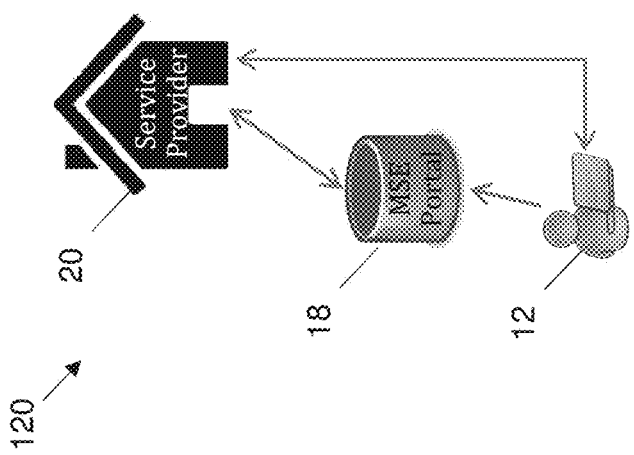
FIG. 12 illustrates a diagram for a method of managing authentications in accordance with one non-limiting aspect of the present invention.

FIG. 12 illustrates a diagram 120 for a method of managing authentications in accordance with one non-limiting aspect of the present invention. The authentications may correspond with any transmissible construct sufficient for identifying an associated user and/or entitlements, rights subscriptions or other authorizations to particular services, such as but not necessary limited to the above described access tokens. The contemplated management may include the first service provider or other trusted entity 18 obtaining access tokens associated with a plurality of users 12 from a plurality of service providers 20 for safekeeping. The access tokens may then be distributed from the service provider to a control device, a sink device and/or one of the plurality of service providers for the purposes of conferring identity, authenticating access and/or otherwise facilitating consumption of services related thereto. The diagram 120 illustrates an exemplary process for providing the access tokens to the first service 18 provider through interactions with a MSE portal/webpage, such as in the manner described above in FIGS. 2-4 or through other operations sufficient to entice the second service provider or other service provider to deliver access tokens to the first service provider for management.

A user may log into the MSE portal to authenticate themselves via the control device 14 or other device with a username and password combination or a through a zero sign-on or credential based process in order to establish a level of trust sufficient for the first service provider to obtain access tokens from the second service provider for management. As shown in FIG. 3 above, the user 12 may select a website or other service provider identifier from a list of MSE partner websites, e.g., websites of service providers having agreed to allow the first service provider 18 to manage access token sufficient to gain access to their services. The MSE portal may be accessed through a browser displaying a corresponding webpage whereby the MSE portal redirects the webpage to a website of the second service provider 20 for the purposes of enabling user authentication. The user authentication to the second service provider 20 may include input of a username and password combination or other information sufficient to identify the user to the second service provider 20 and to enable the second service provider 20 to generate an access token or other access related information sufficient to grant access to one or more services associated therewith.

The website of the second service provider 20, i.e., the website receiving the username and password combination, may then redirect the browser back to the MSE portal along with an access code and a unique identifier for the service or website selected for access. The MSE portal or a server associated therewith may then convert the access code to an access token for future use and associate the user 12 with the access token and unique identifier. The access token generated at the first service provider 18 in this manner may be based on information provided from the second service provider 20, i.e., the access code and unique identifier. Optionally, the second service provider 20 may provide the access token or other information to the first service provider 18, including encrypting the access token/information to prevent the first service provider 18 from using it for other purposes and/or to protect against exposure of the access token via the first service provider 18. The first service provider 18 may then associate the access token or other information with the user 12 according to the login information provided to the MSE portal. Additional security measures may be implemented to ensure that only authorized users 12 are able to obtain access tokens from the second service provider 20, such as by requiring the control device or other device accessing the MSE portal to be within a home or behind an access point associated with the user 12 identified with the username and password combination and/or the first service provider 18 charged with safekeeping of the access tokens.

Figure 13:
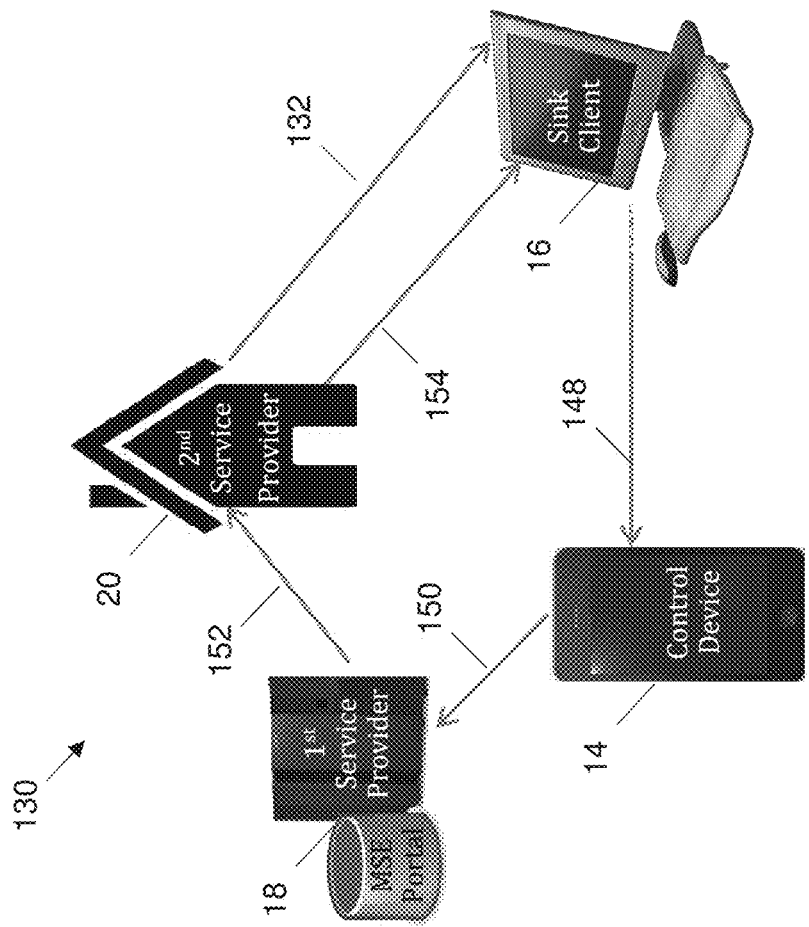
FIG. 13 illustrates a diagram for a method of delegation authorizations in accordance with one non-limiting aspect of the present invention.

FIG. 13 illustrates a diagram 130 for a method of delegation authorizations in accordance with one non-limiting aspect of the present invention. The authorizations being delegated may correspond with the access tokens generated with or provided to the first service provider 18 for safekeeping in accordance with the management processes described above or otherwise kept at a secure location in a manner amenable to the delegation operations contemplated herein. The delegation may begin with the sink device 16 or other device, such as one authenticated or unsecured from the point of view of the second service provider 20 or other service provider, attempting to access a service. The diagram illustrates an exemplary aspect of the present invention where the sink device 16 corresponds with a computer, tablet, mobile phone, gateway or other device having capabilities sufficient to electronically interface services with a user thereof through a login page downloaded 132 from the second service provider 20 or other provider of the desired service. The use of the login page to instantiate access to the service is presented for exemplary non-limiting purposes as the present invention fully contemplates the sink device 16 attempting to access services through other means.

FIG. 14 illustrates a login page 134 in accordance with one non-limiting aspect of the present invention. The login page 134 may be provided to the sink device in a download operation 132 where the second service provider 20 facilitates download of the login page to a browser operating on the sink device 16. The login page 134 may be an entry point for the user to input identifying information, authorizations or other parameters relied upon by the second service provider 20 to authenticate access thereto. The login page 134 may include inputs 136, 138 for receiving a username and password combination (authentication information), an input 140 for selecting a service desired for access and/or other fields associated with providing an entry point for the user to request access to particular services. Input of the username and password combination may be sufficient for the second service provider 20 to authorize the sink device 16 to the desired service. The use of the username and password combination may be problematic for the user to remember and/or it may expose the username and password combination or other authentication information to the sink device 16 or other devices capable of snooping signals transmitted to or from the sink device 16. One non-limiting aspect of the present invention contemplates enabling authentication of the user to access the desired service without having to input the username and password, provide the access token or other authentication information to the sink device 16 and/or without requiring the sink device 16 to provide such information to the second service provider 20.

An indicator 144 may be downloaded with the login webpage to enable user authentication without requiring the authentication information to be exposed to or provided through the sink device 16, e.g., to provide information for transmitting an appropriate access token from the first service provider 18 to the second service provider 20 without reliance on the sink device 16. The indicator is shown in the form of a quick response (QR) code having visually recognizable indicia (e.g., black and white objects or other representations) sufficient for identifying information associated with the attempted instantiation of the desired service. The indicia may be generated by the service provider 20 to identify a universal resource locator (URL)/ address, a unique identifier for the desired service, a session identifier for the download and/or other service information sufficient for identifying the service desired for access and information relevant to the instantiation thereof. The indicator 144 and associated indicia may be generated in advance of the login page 134 being downloaded, such as to provide a generic reference for the service, and/or upon receipt of a request to download the login page 144, such as to provide a unique reference for each attempted access to services. The QR code 144 is shown for exemplary non-limiting purposes as any other type of indicator 144, both visual and non-visual, may be utilized without deviating from the scope and contemplation of the present invention.

An identifier application operating on the control device 14 may be configured to process the indicator 144 for the purposes of recovering or relaying the information embedded therein. The identify application may be configured to instruct the user to take a picture of the indicator 144 using a camera on the control device 14 as part of an indicator recognition process 148. Once an image of the indicator 144 or other representation thereof is obtained by the control device 14, a corresponding credential may be transmitted 150 to the first service provider 18. The credential may include identifying information associated with the control device 14 as well as information recovered from processing the indicia included in the indicator, e.g., the URL/address, identifier of the service, the session identifier etc. (Optionally, the indicator 144 image may be transmitted to the first service provider 18 to recover the corresponding information rather than requiring the control device 14 to decipher the indicia.) The first service provider 18 or a server associated therewith may use the unique identifier and the user identity associated with the control device 14 to lookup that access token associated with the user for the desired service. An access message having the corresponding access token may then be transmitted 152 to the address recovered from the QR code as well as any additional service information necessary for the second service provider 20 to relate the access token to the corresponding instantiation of the service attempted through the sink device 16.

The first service provider 18 may optionally perform an authentication process to determine whether the credential is one of authenticated or unauthenticated before transmitting the access token to the second service provider 20. The credential may be authenticated in the event the control device 14 has previously completed an authentication process or is otherwise deemed to be trusted. The credential may be deemed to be unauthenticated in the event the control device 14 has not properly authenticate itself to the first service provider 18 or is otherwise deemed to be untrusted. In the event the credential is unauthenticated, the service provider 18 may instruct the control device 14 to display a message or otherwise direct the user to input the username and password combination to the login page 134 in order to access the service instead of transmitting the access token to the second service provider 20. In the event the credential is authenticated, the second service provider 20 may perform a validation process to insure the access token received from the first service provider 18 is still valid, and if so, transmit 154 a redirect the browser or otherwise command the sink device 16 to a services page or other access portal used to engage the desired service (e.g., see FIG. 10), thereby delegating an authentication on behalf of the sink device 16 for the desired service without requiring the sink device 16 to receive the access token or to provide the access token to the second service provider 20

The first service provider 18 or other trusted entity may be configured to manage the entrusted access tokens according to the foregoing processes so as to enable the sink device 16 or other on unauthenticated or untrusted device access to services without exposing the access token to such a device. While the use of access tokens is predominately described, other information may be similarly entrusted to the first service provider 18 for similar management and delegation. The first service provider 18 may include processes or other mechanisms to sort any number of access tokens and to associate those access tokens with any number of users and/or control devices 14. Optionally, this may include the first service provider 18 including a database of access tokens cross-referenced with particular users and/or control devices 14, such as according to username and password combinations, MAC addresses, IP addresses or other characteristics believed to be trustworthy. The service information gleaned from the indicator 144 may be tailored to assist the first service provider 18 in identifying appropriate access tokens and to assist with transmitting the access tokens to the second service provider 20 with attendant information sufficient to facilitate the service page or other operation intended to be granted in accordance with entitlements or other rights bound with the access token or user associated therewith.

FIG. 13 illustrates an exemplary implementation of the present invention where the indicator 144 is provided to the same device through which the desired service is accessed. This may be beneficial in providing an enhanced level of security due to the control device 14 having to engage or interact with the device 16 desiring access, particularly if the control device 14 is deemed more trustworthy or its operation is subject to greater scrutiny. The required proximity of the control and sink devices 14, 16 thereby requires the user to be in proximity to a location through which the services are consumed, essentially providing a two-part authentication. Further security measures may be implemented to require addressing, identifications or other descriptors to be common to both of the control and sink devices 14, 16, e.g., addressing information gleaned from messages or other operations performed at the control and sink devices 14, 16 may be compared or verified without requiring that information to be shared between the control and sink devices 14, 16 in the event the control and sink devices 14, 16 are located behind the same access point, cable modem, router, etc. (i.e., where prefixes or other addressing information may be common and sufficient to ascertain relative proximity of the control device 14 to the sink device 16).

The proximal relationship between the control device 14 and the sink device 16 may also be achieved without requiring the indicator 144 to be displayed or otherwise engaged through the sink device 16. One such scenario may coincide with a door entry system where the sink device 16 is an electronically operable door and the indicator 144 is a sticker or other representation presented near the door. The control device 14 may be configured to scan the indicator proximate the door when a user desires a service provider 20 to automatically unlock the door or open a gate. A user identity associated with the control device 14 may then be used to recover a corresponding access token for delivery to the service provider 20. The service provider 20 may identify the door or other area as a function of indicia of the indicator/sticker 144 to determine whether the user associated with the received access token is entitled to access. Such an implementation may be particularly beneficial in enabling mobile phone users to scan indicators/stickers in office buildings or other locations having multiple entry points to control entry to related areas. Associating the indicator 144 with a sticker or other static representation may be a relatively low cost solution for verifying trust or otherwise authenticating users as being in proximity to a particular location. Such a capability can have many benefits and can be useful to control access to any number of services, such as to enable passive entry to vehicles, authenticate users before starting vehicles, authenticating users at a point-of-sale (POS) device, tracking packages, etc.

One non-limiting aspect of the present invention contemplates a user-name/password used to login to websites being replaced with an access token specific to a user for that website. The access tokens for users may be periodically updated and managed directly between trusted entities and without exposure to control or sink devices 14, 16, e.g., service providers may prefer interacting with other service providers rather than directly with customers or customer devices. This may have one or more of the following advantages: the access token is never exposed to either the MSE user, the MSE app or the Website login page so it can never be stolen by observing access network communication or client device internals; if the access token is ever stolen from the cloud (MSE Server or Website), its use can be revoked and it can be replaced by a new access token, optionally in a manner invisible to the user and that has no impact on user devices or Web pages; access tokens can be updated on a periodic basis without impacting the user, which greatly reduces the threat of access token exposure; the MSE Website Identity service is a Website user identity broker but is never in possession of the user's Website user-name/password; and/or the user no longer needs to remember or enter Website user-name/password.

As supported above, one non-limiting aspect of the present invention relates to a method for delegating authorizations, such as to facilitate access to user services with a non-authorized device. The method may be embodied in a computer-readable medium, included one or more of the devices described above, having a plurality of computer-readable instructions operable with a processor and sufficient to facilitate the operations contemplated herein. The present invention may be utilized to enable an authenticated user on a personal device to confer their identity to a second, non-authenticated device, so that non-authenticated device can participate in an authorization protocol, such as SAML or OAUTH, using the authenticated user's identity and a specified identity provider. The capability to confer authorizations may be beneficial in order to enable, among other things, a means for a user to access their MSO, 3rd party and personal services via unsecured devices without having to perform any authentication steps on that unsecured device. This capability may be beneficial in ameliorating the need for the user to remember user name and password combinations over long periods of time for certain service providers as well as to limit others from detecting their user-name and password combination, e.g., the control device 14 may optionally be authenticated using ZSO so that the stored access tokens can be conferred to the sink device 16 without the user ever having to enter in username and password.

The present invention may facilitate a broad set of MSO services whereby an MSO customer can access any of their MSO, personal or 3rd party services, through the MSO customer's personal device on any nearby audio/video display device without any explicit login or authentication on that nearby device. This provides customers a seamless way to access any of their services wherever they are. It may be particularly helpful in leveraging capabilities for current video and broadband subscriber bases as well as to make the related MSO service richer. One non-limiting aspect of the present invention contemplates discriminating services on a per customer or individual customer basis, including using such individuality to enable users to access their MSO services on 3rd party browsers without having to specify their identity provider, without having to authenticate that the user is an MSO customer and/or without out requiring user input on the unsecured device.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method for delegating access tokens relied upon to authenticate access to services, the method comprising:
receiving a plurality of access tokens from a plurality of service providers after the plurality of service providers associates each of the plurality of access tokens with at least one of a plurality of users;
associating the plurality of access tokens with a plurality GP of control devices, the plurality of control devices each having been previously authenticated with at least one of the plurality of users;
receiving a first credential generated in response to a sink device being engaged to access a first service associated with a first service provider of the plurality of service providers at a first instance in time;
identifying a first control device of the plurality of control devices associated with the first credential as a function of information included within the first credential;
identifying a first access token of the plurality of access tokens associated with a first user of the plurality of users associated with the first control device; and
transmitting the first access token to the first service provider at a second instance in time occurring after the first instance, the first service provider granting the sink device access to the first service at the second instance according to entitlements of the first user if the first access token is valid when received, thereby enabling the sink device to access the first service without providing the first access token to the first service provider.

2. The method of claim 1 further comprising determining at least a portion of the information included in the first credential as a result of the sink device determining an identity of the first control device.

3. The method of claim 1 further comprising determining at least a portion of the information included in the first credential as a result of the sink device determining an indicator displayed on the first control device having an indicia sufficient for identifying the first control device.

4. The method of claim 3 further comprising instructing an identifier application on the sink device to determine the indicia by processing an image of the indicator captured with a camera of the sink device.

5. The method of claim 4 further comprising instructing the first user to capture the image by positioning the camera to take a picture of a webpage displayed on the first control device.

6. The method of claim 5 further comprising transmitting a redirect message to a browser operating on the sink device to automatically direct the browser to a service page used to engage the first service.

7. The method of claim 1 further comprising:
updating the first access token after being determined as invalid with a second access token received from the first service provider at a third instance in time occurring after the second instance;
receiving a second credential generated while the sink device is being engaged to access the first service at a fourth instance in time occurring after the third instance; and
transmitting the second access token to the first service provider at a fifth instance in time occurring after the fourth instance as a function of information included within the second credential, the first service provider granting the sink device access to the first service at the fifth instance if the second access token is valid when received, thereby enabling the sink device to access the first service without providing the second access token to the service provider.

8. The method of claim 1 further comprising:
transmitting an authentication request to the first control device at a third instance in time occurring before the first instance, the authentication request requesting the first control device to indicate an acceptance or a denial for transmission of the first access token to the first service provider;
transmitting the first access token to the first service provider when the authentication request indicates the acceptance; and
denying transmission of the first access token to the first service provider when the authentication request indicates the denial.

9. A non-transitory computer-readable medium having a plurality of non-transitory instructions operable with a processor to facilitate access to services of a service provider, the processor being a hardware construct capable of executing the plurality of non-transitory instructions, the non-transitory instructions being sufficient for:
associating each of a plurality of access tokens with at least one of a plurality of users;
associating each of the plurality of access tokens with at least one of a plurality or control devices, the plurality of control devices each having been previously authenticated with at least one of the plurality of users;
determining a credential generated in response to a sink device being engaged to access a service associated with the service provider at a first instance in time;
identifying a control device of the plurality of control devices associated with the credential as a function of information included within the credential;
identifying an access token of the plurality of access tokens associated with a user of the plurality of users associated with the control device; and
transmitting the access token to the service provider at a second instance in time occurring after the first instance when use of the access token is authenticated, the service provider granting the sink device access to the service at the second instance according to entitlements of the user if the access token is valid when received, thereby enabling the sink device to access the service without providing the access token to the service provider.

10. The non-transitory computer-readable medium of claim 9 wherein the non-transitory instructions are sufficient for determining at least a portion of the information included in the credential as a result of the sink device determining an identity of the control device.

11. The non-transitory computer-readable medium of claim 10 wherein the non-transitory instructions are sufficient for instructing the sink device to perform a discovery process whereby the identity of the control device is determined from messages exchanged between the sink device and the control device.

12. The non-transitory computer-readable medium of claim 9 wherein the non-transitory instructions are sufficient for determining at least a portion of the information included in the credential as a result of the sink device determining a (MAC) addresses of the control device.

13. The non-transitory computer-readable medium of claim 9 wherein the non-transitory instructions are sufficient for determining at least a portion of the information included in the credential as a result of the sink device determining a username for a user thereof.

14. The non-transitory computer-readable medium of claim 9 wherein the non-transitory instructions are sufficient for determining at least a portion of the information included in the credential as a result of the sink device determining an indicator displayed on the control device having an indicia sufficient for identifying the control device.

15. The non-transitory computer-readable medium of claim 14 wherein the non-transitory instructions are sufficient for instructing an application on the sink device to determine the indicia by processing an image of the indicator captured with a camera thereof.

16. The non-transitory computer-readable medium of claim 9 wherein the non-transitory instructions are sufficient for determining at least a portion of the information included in the credential as a result of information input to a login page displayed with a browser operating on the sink device, the login page being utilized by the sink device to access the service.

17. The non-transitory computer-readable medium of claim 9 wherein the non-transitory instructions are sufficient for:
transmitting an authentication request to the control device at a third instance in time occurring before the first instance, the authentication request requesting the control device to authenticate use of the access token with an acceptance or a denial;
transmitting the access token to the service provider when the authentication request indicates the acceptance; and
denying transmission of the access token to the service provider when the authentication request indicates the denial.

18. A method for authenticating a sink device to access a service associated a service provider without requiring the sink device to provide an access token required by the service provider to access the service, the method comprising:
associating the access token with a user authenticated access to the service;
associating the access token with at least one of a plurality of control devices, the plurality of control devices each having been previously authenticated with the user;
determining a credential generated in response to the sink device being engaged to access a service associated with the service provider at a first instance in time;
identifying a control device of the plurality of control devices associated with the credential as a function of information included within the credential; and transmitting the access token to the service provider at a second instance in time occurring after the first instance when use of the access token is verified by the control device, the service provider granting the sink device access to the service at the second instance according to entitlements of the user if the access token is valid when received, thereby enabling the sink device to access the service without providing the access token to the service provider.

19. The method of claim 18 further comprising:
transmitting an verification request to the control device at a third instance in time occurring before the first instance, the verification request requesting the control device to authenticate use of the access token with an acceptance or a denial;
transmitting the access token to the service provider when the authentication request indicates the acceptance; and
denying transmission of the access token to the service provider when the authentication request indicates the denial.

20. The method claim 18 further comprising:
transmitting the verification request to the control device via a webpage displayed on a browser of the control device; and
determining the acceptance or the denial as a function of an input made via the control device to the webpage displayed on the browser.

* * * * *